United States Patent [19]

Adams et al.

[11] 4,096,878

[45] Jun. 27, 1978

[54] VALVE GROUP SUBASSEMBLY

[75] Inventors: Stanley B. Adams, Yorkville; Gregory A. Loebbaka, Aurora; Michael P. Morge, Oswego, all of Ill.

[73] Assignee: Caterpillar Tractor Co., Peoria, Ill.

[21] Appl. No.: 675,360

[22] Filed: Apr. 9, 1976

[51] Int. Cl.[2] .......... F16K 51/00

[52] U.S. Cl. .......... 137/351; 91/44; 180/66 R; 137/343; 214/140

[58] Field of Search .......... 214/140, 761, 762, 763, 214/764; 73/49.7, 168; 137/343, 351, 354; 251/143; 180/66 R; 91/414

[56] References Cited

U.S. PATENT DOCUMENTS

| | | | |
|---|---|---|---|
| 2,249,339 | 7/1941 | Wells et al. | 137/344 |
| 2,394,363 | 2/1946 | Bynoe | 285/DIG. 15 |
| 2,692,614 | 10/1954 | McLeod | 137/596.15 |
| 2,758,640 | 8/1956 | Hubbard | 137/343 X |
| 2,927,602 | 3/1960 | Eklund | 137/343 |
| 2,994,339 | 8/1961 | Massey | 137/343 |
| 3,532,319 | 10/1970 | Brown | 248/15 X |
| 3,967,534 | 7/1976 | Cryder et al. | 91/461 X |

*Primary Examiner*—Martin P. Schwadron
*Assistant Examiner*—Richard Gerard
*Attorney, Agent, or Firm*—Wegner, Stellman, McCord, Wiles & Wood

[57] ABSTRACT

A valve group subassembly for use in a vehicle having hydraulically operable mechanisms. The subassembly includes the main valve and actuators, interconnecting duct structures, and a mounting bracket permitting the complete subassembly of the control elements. A pilot valve manifold is mounted to the bracket for hydraulic connection thereto of the pilot valves. The bracket may be resiliently mounted. The valves may be provided with removable valve stems, permitting the valve bodies to be maintained mounted to the bracket in servicing the individual valves. The subassembly is arranged to permit a bench testing thereof prior to the installation in the vehicle.

10 Claims, 3 Drawing Figures

VALVE GROUP SUBASSEMBLY

BACKGROUND OF THE INVENTION

1. Field of the Invention

This invention relates to hydraulic control means and in particular to hydraulic control means for use in vehicles.

2. Description of the Prior Art

In vehicles such as earth moving vehicles, different auxiliary mechanisms of the vehicle are conventionally hydraulically operated. Controls may be provided for manual operation by the driver of the vehicle for controlling the hydraulic mechanisms by means of suitable main valves, in turn controlled by pilot valves.

It is further conventional in such hydraulic systems to provide relief means for maintaining the pressure in the hydraulic system below a preselected maximum.

It is still further conventional to provide in hydraulic systems manifolds to which a number of the hydraulic components of the system may be hydraulically connected.

In the conventional vehicle, the control valves and pilot valves may be mounted at different portions of the vehicle with suitable interconnecting ducts to the source of pressurized hydraulic fluid and manual control means. Thus, conventionally, the different valves are tested individually prior to installation in the vehicle and the interconnecting ducts must be installed individually to the various separately mounted valves and mechanisms.

SUMMARY OF THE INVENTION

The present invention comprehends an improved subassembled hydraulic control arrangement wherein the main valves and pilot valves are mounted to a unitary support so that the subassembly may be mounted as a unit in the vehicle after being bench tested as a unit.

The subassembly is arranged for facilitated servicing such as by removal of the entire subassembly as a unit for servicing, or the servicing of the individual valves. The individual valves may have removable valve stems with the valves being positioned on the support for facilitated removal thereof without removing the valve bodies.

A manifold may be provided for connection of the pilot valves thereto and may be suitably coded for facilitated hookup.

The support may be resiliently mounted for facilitated assembly and control of noise in the use of the vehicle and hydraulic mechanisms.

The use of a modular subassembly design provides improved economy in the construction of the vehicle and facilitated servicing over the nonunitarily installed control means of the prior art.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
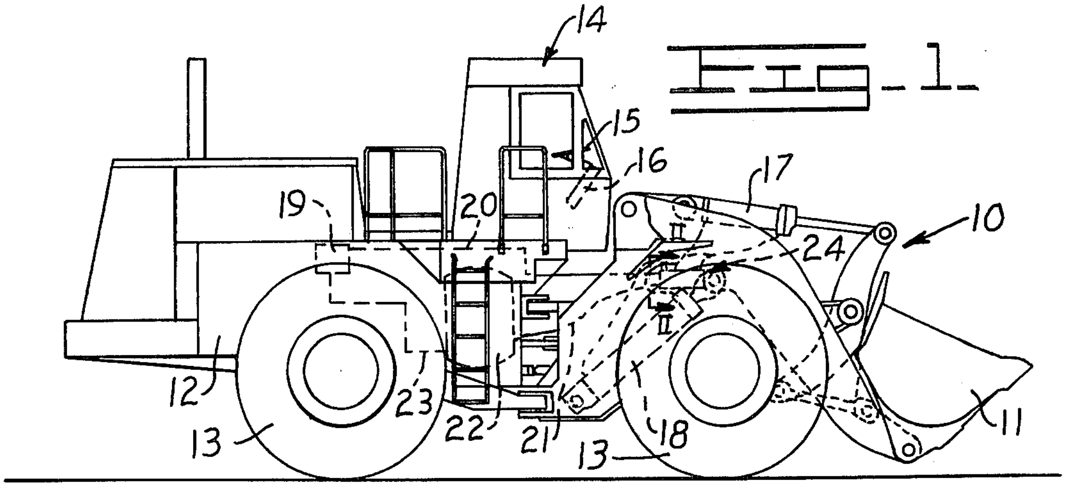
FIG. 1 is a side elevation of a loader vehicle having a valve group subassembly embodying the invention.

In the exemplary embodiment of the invention as disclosed in the drawing, a vehicle generally designated 10 is shown to comprise a loader vehicle having a front loading bucket 11 carried at the front of a body 12 provided with wheels 13 and having a driver's cab 14 provided with a suitable steering wheel 15 and control panel 16.

The bucket 11 may be controlled by the operator from panel 16 so as to be selectively forwardly or rearwardly tilted and raised or lowered as desired. Tilting of the bucket 11 is effected by a tilt cylinder 17 and the raising and lowering of the bucket is controlled by a lift cylinder 18. Suitable pilot circuit and implement circuit pumps 19 may be provided as a supply of pressurized hydraulic fluid to the cylinders under the control of the operator. Thus, a high pressure supply line 20 is provided for delivering pressurized fluid from the pumps 19 and a fluid return line 21 is provided for returning fluid from the cylinders to a hydraulic tank 22 from which the fluid is returned to the pumps 19 through a further return line 23.

The present invention comprehends the provision of a control valve subassembly generally designated 24 which is mounted in a suitable housing 25 carried on the body 12 of the vehicle for facilitated hydraulic connection of the cylinders to the pumps 19, fluid return line 21, and operator control panel 16.

Figure 2:
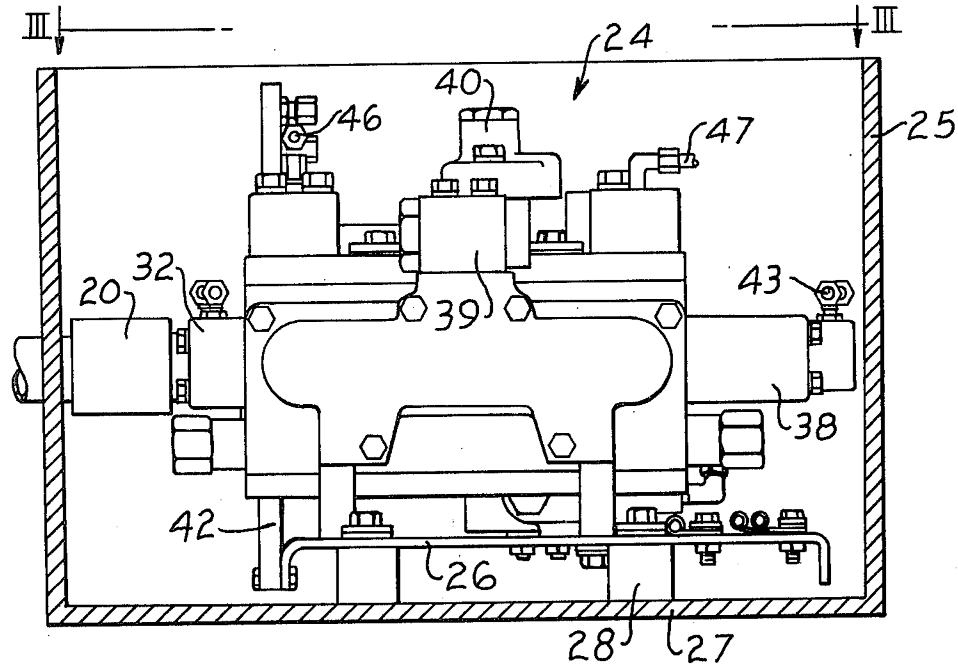
FIG. 2 is an end elevation of the valve group subassembly installed in a housing in the vehicle.
Figure 3:
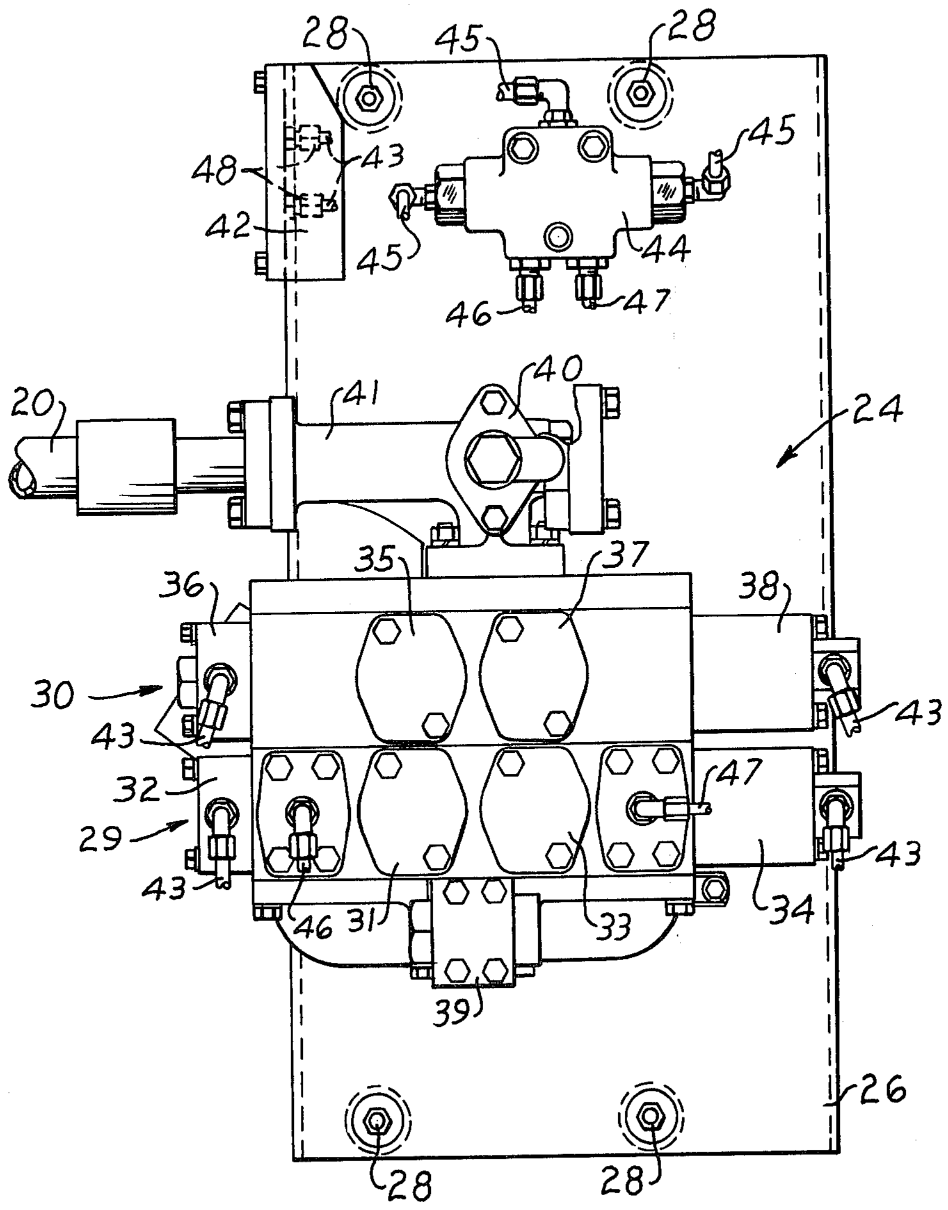
FIG. 3 is a top plan view of the valve group subassembly.

Referring now more specifically to FIGS. 2 and 3, the control valve subassembly 24 is removably received within housing 25 and includes a support bracket 26 which is resiliently mounted to the bottom wall 27 of housing 25 by suitable resilient supports 28.

The subassembly 24 includes a lift cylinder control valve group 29 and a tilt cylinder control valve group 30. The lift cylinder group includes a lift cylinder lower port valve 31 and an associated pilot valve 32, and a lift cylinder raise port valve 33 and associated pilot valve 34. The tilt cylinder control valve group includes a tilt cylinder rack back port valve 35 and an associated pilot valve 36, and a tilt cylinder dump port valve 37 and an associated pilot valve 38. A tank port valve 39 for both the lift and tilt cylinders is provided adjacent the lift cylinder valve group 29.

A pressure relief valve 40 is provided adjacent the tilt cylinder control valve group 30. The supply line 20 is connected to an inlet manifold 41, in turn to which the relief valve 40 is connected. Pressurized fluid from supply 20 is delivered therefrom to the main control valve groups 30 and 31.

A pilot valve manifold 42 is provided for receiving pressurized hydraulic fluid from the pilot circuit pump 19 and is interconnected to the different pilot valves by suitable interconnecting lines 43.

A selector valve 44 is provided which is also connected to the pilot valves through a plurality of interconnecting lines 45 and to the lift cylinder valves 31 and 33 by interconnecting lines 46 and 47.

The specific hydraulic flow arrangement of the control valve subassembly forms no part of the invention. Rather, the invention is concerned with the provision of the various main control and pilot control valves, relief valve, manifolds, and selector valves of the subassembly as a unit for facilitated assembly, testing, and servicing. Thus, the present invention comprehends the mounting of each of these elements on the unitary support bracket 26 as a subassembly which may be bench tested prior to its installation in the vehicle, thereby permitting the simple connection of the different hydraulic fluid lines of the vehicle to the centralized valve group. The various components of the subassembly may be removably mounted to the support bracket 26 by any suitable means, and as best seen in FIG. 2, the valves may be arranged to extend upwardly so as to have removable valve stem portions thereof readily removed upwardly from the housing 25 without requiring the removal of the entire subassembly 24 therefrom.

By providing the interconnections between the supply manifold and main valves, the interconnections between the main valves and pilot valves, and the interconnections between the pilot valves and pilot manifold, an improved facilitated testing of the subassembly may be effected by a bench testing operation prior to the installation of the apparatus in the vehicle. The provision of the subassembly permits the arrangement to define a modular design for facilitated installation in any one of a group of different vehicles by suitable modification of the valve grouping as desired.

For further facilitated assembly, the manifold connections 48 may be suitably coded to assure proper hookup of the pilot valves thereto.

The resilient mounting of the support in the housing 25 facilitates assembly and provides noise control in the installation.

As the valve group may be serviced either by complete removal of the subassembly 24 from the housing and bench servicing, or the servicing of the individual valves without removal of the valve bodies from the assembly, further facilitated use of the subassembly is provided.

The foregoing disclosure of specific embodiments is illustrative of the broad inventive concepts comprehended by the invention.

We claim:

1. In a vehicle having hydraulically operable mechanisms, means for providing controlled delivery of hydraulic fluid from a pressurized supply to said mechanisms including a plurality of main valves and a plurality of pilot valves for controlling operation of the main valves, each of said valves having removable movable valve members, a cab, a housing carried by the vehicle remotely of the cab, and operator-controllable controls in said cab for operating said pilot valves, the improvement comprising: a unitary support; means mounting said main valves to said support; means mounting said pilot valves to said support; a manifold; means mounting said manifold to said support; interconnecting duct means hydraulically interconnecting said valves and manifold; connecting means for removably connecting said interconnecting duct means to said supply; connecting means for removably hydraulically connecting said main valves to said vehicle mechanisms; connecting means for removably hydraulically connecting said pilot valves to said controls in said vehicle cab; and means for removably mounting said support with said valves, duct means, and connecting means as a unit in said housing with said valves disposed to permit removal of said removable valve members from the valves with the valve body portion being maintained mounted to the support.

2. The vehicle structure of claim 1 wherein said means for mounting said support to said vehicle comprises a resilient mounting means.

3. The vehicle structure of claim 1 wherein said support comprises a plate bracket.

4. The vehicle structure of claim 1 wherein a selector valve is mounted to said support and connected to said interconnecting duct means.

5. The vehicle structure of claim 1 wherein said support defines an auxiliary portion arranged to carry at least one additional main valve.

6. The vehicle structure of claim 1 further including a relief valve, and means mounting said relief valve to said support.

7. The vehicle structure of claim 1 further including a relief valve, means mounting said relief valve to said support, and means hydraulically connecting said relief valve to said interconnecting duct means.

8. The vehicle structure of claim 1 wherein said mechanisms include cylinders for controlling disposition of a loader bucket.

9. The vehicle structure of claim 1 wherein said manifold and pilot valves are arranged for facilitated connection of said means for hydraulically connecting said pilot valves thereto.

10. The vehicle structure of claim 1 wherein said means for mounting said support is arranged to mount said support in said housing with said valves disposed uppermost.

* * * * *